United States Patent [19]

Lau

[11] Patent Number: 4,957,693
[45] Date of Patent: Sep. 18, 1990

[54] PRESSURIZED WATER NUCLEAR REACTOR SYSTEM WITH HOT LEG VORTEX MITIGATOR

[75] Inventor: Louis K. S. Lau, Monroeville, Pa.

[73] Assignee: Westinghouse Electric Corp., Pittsburgh, Pa.

[21] Appl. No.: 293,160

[22] Filed: Jan. 3, 1989

[51] Int. Cl.⁵ .............................................. C21C 9/00
[52] U.S. Cl. .................................... 376/298; 376/352
[58] Field of Search ............... 376/282, 283, 298, 299, 376/352, 402

[56] References Cited

U.S. PATENT DOCUMENTS

| | | | |
|---|---|---|---|
| 4,064,001 | 12/1977 | Duncan | 376/282 |
| 4,187,147 | 2/1980 | Braun et al. | 376/299 |
| 4,280,796 | 7/1981 | Reinsch | 376/298 |
| 4,643,871 | 2/1987 | Fajeau | 376/298 |
| 4,753,771 | 6/1988 | Conway et al. | 376/298 |
| 4,769,209 | 9/1988 | Tower et al. | 376/402 |

Primary Examiner—Daniel D. Wasil

[57] ABSTRACT

A pressurized water nuclear reactor system includes a vortex mitigator in the form of a cylindrical conduit between the hot leg conduit and a first section of residual heat removal conduit, which conduit leads to a pump and a second section of residual heat removal conduit leading back to the reactor pressure vessel. The cylindrical conduit is of such a size that where the hot leg has an inner diameter $D_1$, the first section has an inner diameter $D_2$, and the cylindrical conduit or step nozzle has a length L and an inner diameter of $D_3$; $D_3/D_1$ is at least 0.55, $D_2$ is at least 1.9, and $L/D_3$ is at least 1.44, whereby cavitation of the pump by a vortex formed in the hot leg is prevented.

7 Claims, 2 Drawing Sheets

PRESSURIZED WATER NUCLEAR REACTOR SYSTEM WITH HOT LEG VORTEX MITIGATOR

This invention was generated under Contract No. DE-AC03-86SF16038 with the United States Department of Energy.

FIELD OF THE INVENTION

This invention relates to a pressurized water nuclear reactor system, including a hot leg for charging hot fluid from a reactor pressure vessel to a steam generator, the system having a residual heat removal device and a vortex mitigator provided for the hot leg of the system.

BACKGROUND OF THE INVENTION

Incidents have been reported concerning the loss of residual heat removal system (RHRS) operation due to human errors, equipment malfunctions and loss of cooling fluid inventory in the reactor coolant system. Among the incidents reported, some have occurred because the cooling fluid level in the reactor coolant system was drained too low. When the reactor coolant system (RCS) water level is drained below a certain level, vortex begins to form and the residual heat removal (RHR) pumps are cavitated or become airbound. The RHR pumps must be manually stopped to prevent damage. In current PWR plants these pumps are safety injection pumps. Consequently, decay heat removal and low head safety injection functions are lost, resulting in RCS heatup and potential core uncovery. An extended period of core uncovery would cause fuel damage.

The time margin available for restoring the RHRS, or establishing alternate methods of heat removal (prior to bulk boiling, core uncovery, fuel damage, etc.) depends on the RCS temperature, the decay heat rate (which is dependent on time interval elapsed from reactor trip to RHRS failure and core power operation history), and the amount of RCS inventory.

One of the worst cases would be the loss of RHRS during mid-loop operation. Mid-loop operation is an operation where the RCS is partially drained to approximately the mid-level of the hot leg to perform steam generator inspection or repairs. The RHR pump operates at its designated flow rate and the RCS inventory is reduced. If the RCS inventory drops below a certain level (which may occur rapidly since there is little level margin in the RCS), vortex begins to form and the RHR pump cavitates, resulting in a loss of RHRS. The reduced RCS inventory reduces the time available to recover the RHRS prior to bulk boiling and core uncovery.

An improved such pressurized water nuclear reactor system differs from traditional PWR design in that it does not have an independent RHR system. An example of such an improved system is described in U.S. No. 4,769,209, issued Sept. 6, 1988, and assigned to the assignee of the present invention, the contents of said patent being incorporated by reference herein. The traditional decay heat removal function combines with the spent fuel cooling function to form a spent cooling system in such an improved system. One advantage of such a combination is that the improved pressurized water nuclear reactor system spent fuel cooling system can perform a spent fuel pit cooling and decay heat removal simultaneously and independently. Because the two identical pump and heat exchanger trains can be used interchangeably, a RHR capacity redundancy requirement is fulfilled. The other advantage is that the pumps are no longer safety injection pumps.

However, the loss of RHR cooling problem associated with the mid-loop operation in traditional plants still applies to this improved pressurized water reactor system. In the improved system, the steam generator inspection and repair requires that the hot leg water level be drained to a certain level. Since the decay heat removal pump takes suction from the hot leg while the mid-loop operation is in progress, too low a hot leg level can induce vortex and cavitate the pump, resulting in similar consequences as in traditional PRW plants.

It is an object of the present invention to provide a decay heat removal system, containing a pump, in a pressurized water nuclear reactor that will minimize or eliminate vortex induced cavitation or air introduction into the pump of the system.

SUMMARY OF THE INVENTION

A pressurized water nuclear reactor system includes a reactor pressure vessel, at least one steam generator, a hot leg for discharging hot fluid from the reactor pressure vessel to a steam generator and at least one cold leg for discharging cool water from the steam generator back to the reactor pressure vessel, and a residual heat removal device having a vortex mitigator therein.

The residual heat removal device includes a first section of conduit, a pump, and a second section of conduit and the associated valves and instrumentation. The first section of conduit carries fluid that is discharged from the hot leg to the pump, while the second section of conduit returns fluid from the pump back to the interior of the reactor pressure vessel.

A step nozzle is provided, in the form of a cylindrical conduit, which interconnects the hot leg and the first section of residual heat removal conduit, the step nozzle having particular dimensions relative to the hot leg and first section of conduit so as to prevent formation of a vortex that would cause cavitation of the pump of the residual heat removal system.

The step nozzle, in order to minimize or eliminate vortex induced cavitation or airbound at the pump suction, is located between the hot leg and the first section of residual heat removal conduit and has a diameter such that the quotient of the diameter thereof divided by the diameter of the hot leg is at least 0.55, and the quotient of the diameter thereof divided by the diameter of the first section of residual heat removal conduit is at least 1.9. The length of the step nozzle must also be of a particular dimension, such that the quotient of the length divided by the diameter thereof is at least 1.44.

BRIEF DESCRIPTION OF THE DRAWINGS

The invention will become more readily apparent from the following description of a preferred embodiment thereof shown, by way of example only, in the accompanying drawings, wherein.

DETAILED DESCRIPTION

Figure 1:
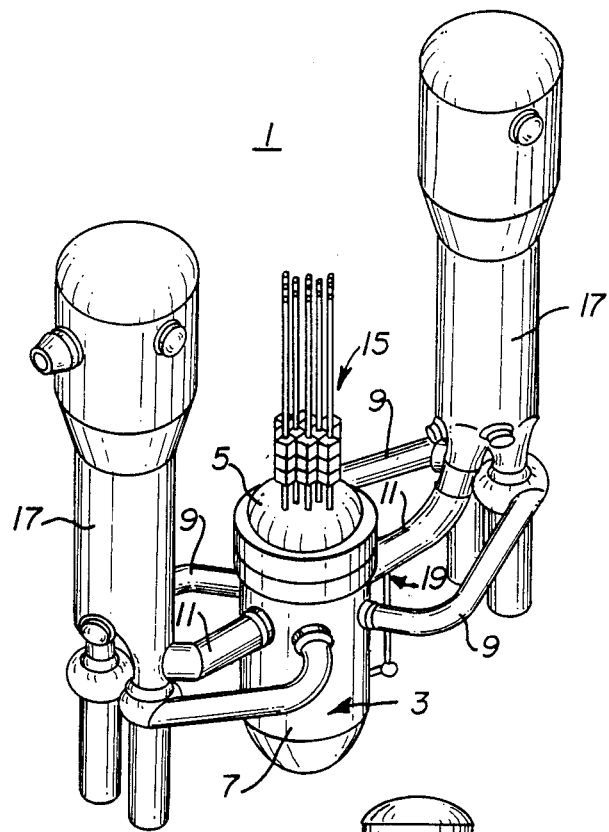
FIG. 1 is a perspective view of a pressurized water nuclear reactor system incorporating the vortex mitigator of the present invention.
Figure 2:
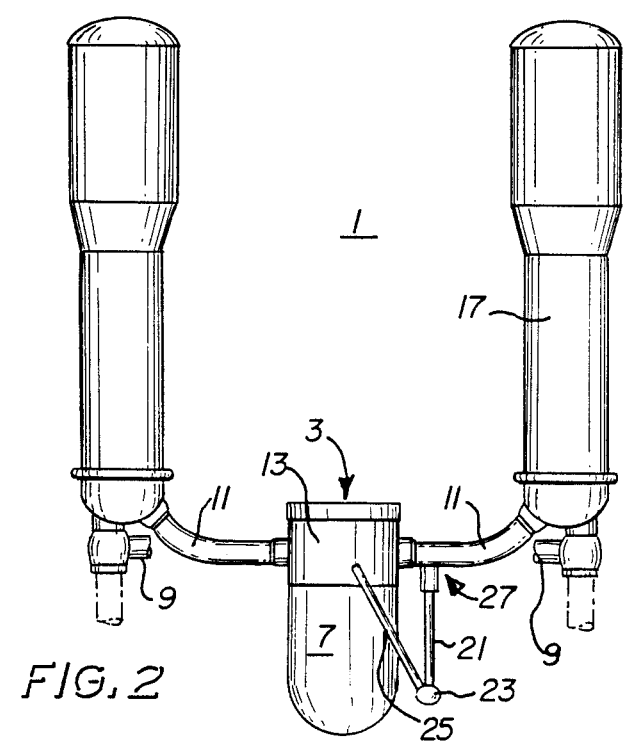
FIG. 2 is an elevational view of the pressurized water nuclear reactor system of FIG. 1 illustrating a mid-loop operational state.

Referring now to FIGS. 1 and 2, a pressurized water nuclear reactor system 1 is illustrated including a reactor pressure vessel 3 having a removable head portion 5 and a body portion 7. The reactor pressure vessel 3 has at least one coolant flow inlet means or cold leg conduit 9 and at least one coolant flow outlet means or hot leg conduit 11, formed integrally with and through the wall 13 of the body portion 7 of the reactor pressure vessel 3. The reactor pressure vessel 3 contains a nuclear core (not shown) which has a plurality of nuclear fuel elements which generate heat depending primarily on the position of control means 15, passing through the head portion 5 of the reactor pressure vessel 3. The heat generated by the reactor core is conveyed from the core by coolant flow entering through cold leg conduit 9 and exiting through the hot leg conduit 11, as is conventional in the art. The hot leg conduit carries the hot coolant fluid to a steam generator 17 where steam is produced to provide energy and the spent or cool coolant fluid therefrom then returned to the reactor pressure vessel 3 by means of the cold leg conduit 9. In the embodiment illustrated, two steam generators 17 are associated with a single reactor pressure vessel 3, with a single hot leg conduit leading from the reactor pressure vessel 3 to each of the steam generators 17 and a pair of cold leg conduits 9 leading from each steam generator 17 back to the reactor pressure vessel 3, although other hot leg and cold leg arrangements can be used.

During mid-loop operation, as illustrated in FIG. 2, the head 5 of the reactor pressure vessel and the control means 15 are removed and residual heat removal effected by continued circulation of coolant from the hot leg 11 through a residual heat removal system 19 which contains discharge conduit or first section of residual heat removal conduit 21 from the hot leg 11 to a pump 23 and a return conduit or second section of residual heat removal conduit 25 from the pump 23 which communicates with the interior of the reactor pressure vessel 3. It is during such a mid-loop operation that cavitation of the pump 23 may occur due to vortexing of the fluid in the hot leg 11 to the first section of residual heat removal conduit 21.

Figure 3:
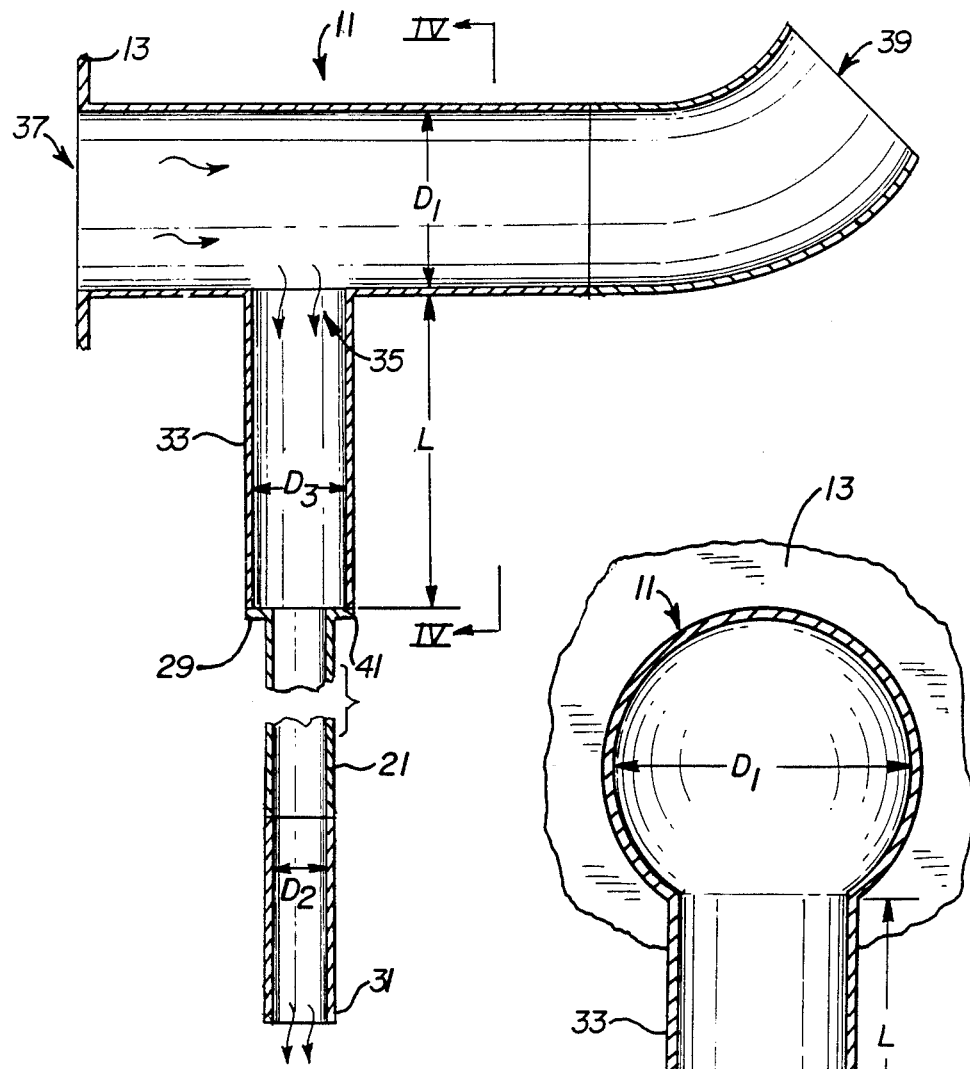
FIG. 3 is a cross-sectional view of the vortex mitigator of the present invention with the necessary relative dimensions thereof shown.

In accordance with the present invention, a residual heat removal device 27 is provided that precludes cavitation of the fluid in the hot leg upon flow to the first section of residual heat-removal conduit 21 and thence to the pump 23. As illustrated, a cylindrical hot leg 11 has a first diameter $D_1$ (FIG. 3). A first section of cylindrical residual heat removal conduit 21 has a first end 29 for receipt of fluid from the hot leg and a second end 31 connected to the pump 23. The second section of residual heat removal conduit 25 connects the pump with the reactor pressure vessel 3.

A step nozzle 33, in the form of a cylindrical conduit, is provided which interconnects the hot leg 11, at outlet orifice 35 formed therein, with the first end 29 of the first section of residual heat removal conduit 21 and communicates therewith to provide flow of fluid from the hot leg 11 to the first section of residual heat removal conduit 21.

In order to minimize or prevent cavitation of the pump 23 due to the vortex introduced by the fluid from the hot leg 11, the inner diameters of the hot leg 11, the step nozzle 33 and the first section of the residual heat removal conduit 21 must have predetermined relative dimensions sufficient to reduce the momentum of the vortex formed in the hot leg and break up the vortex to prevent air flow into and cavitation of the pump 23.

Figure 4:
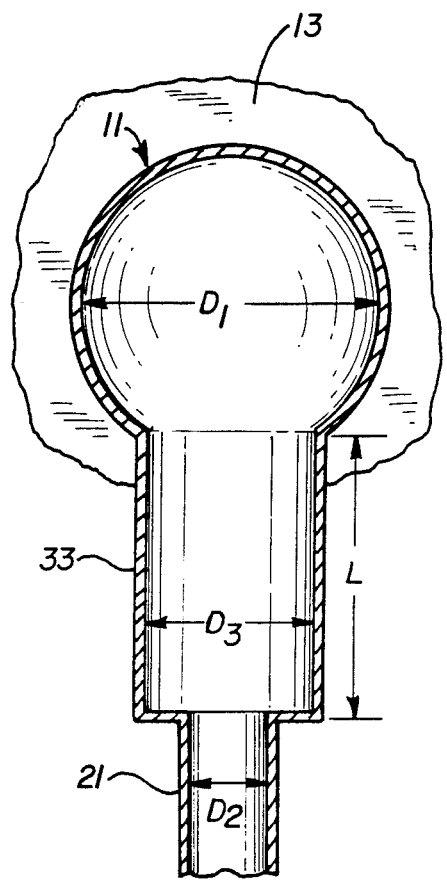
FIG. 4 is a view taken along lines IV—IV of FIG. 3.

As best illustrated in FIGS. 3 and 4, the hot leg 11 has an inner diameter of a predetermined value $D_1$, while the first section of residual heat removal conduit 21 has an inner diameter of a predetermined value $D_2$. The step nozzle 33, also in the form of a cylinder, has a specific length and diameter. The inner diameter $D_3$ of the step nozzle 33 must have a relative value to the inner diameter $D_1$ of the hot leg 11, and is of a value such that $D_3/D_1$ is equal to or greater than 0.55, i.e. $D_3/D_1 \geq 0.55$. In addition, the inner diameter $D_3$ of the step nozzle 33 must have a relative value to the inner diameter of the first section of residual heat removal conduit 21, and is of a value such that $D_3/D_2$ is equal to or greater than 1.9, i.e. $D_3/D_2 \geq 1.9$.

In addition to having a specific relative diameter to each of the hot leg 11 and the first section of residual heat removal conduit 21, the step nozzle 33, in order to prevent or minimize cavitation, must have a predetermined length L relative to the inner diameter $D_3$ thereof. The length L of the step nozzle 33 must have a value such that $L/D_3$ is equal to or greater than 1.44, i.e. $L/D_3 \geq 1.44$.

The following dimensions illustrate the relative dimensions usable according to the present invention:

Hot leg (11) inner diameter $D_1 = 78.74$ cm (31 inches);

First Section RHR conduit (21) inner diameter $D_2 = 22.23$ cm (8.85 inches);

Step nozzle (33) inner diameter $D_3 = 43.38$ cm (17.08 inches); and

Step nozzle (33) length $L = 62.48$ cm (24.6 inches).

Test results have shown that when the above conditions are fulfilled, the first section of the residual heat removal conduit 21 fails to distinguish the step nozzle 33 from the hot leg 11, which hot leg 11 is adapted to receive fluid from the reactor vessel through inlet 37 and discharge the fluid through outlet 39 to a steam generator.

By using the step nozzle 33 in the residual heat removal system of the particular dimensions, cavitation or air introduction into the pump 23 is minimized or eliminated.

The principles behind the use of these particular dimensions are believed to be twofold:

(a) the step nozzle becomes an integral part of the hot leg. Consequently, the water inventory is increased—a parameter that has a major influence on the formation of vortex at a given flowrate; and (b) the step nozzle gives a slower velocity than that of the first section of residual heat removal conduit. Consequently, the Froude number is smaller at the step nozzle—another parameter that has a major influence on the formation of vortex at a given flowrate.

The improved vortex mitigator as described herein may be used in a new construction of a pressurized water nuclear reactor system, or incorporated as a retrofit to an existing such installation. When the vortex mitigator is used as a retrofit to an existing pressurized water nuclear reactor plant, the first section of residual heat removal conduit 21 must be disconnected from the hot leg 11 at their joint. The step nozzle 33 is then inserted between and welded to the hot leg 11 and to the first section of residual heat removal conduit 21, as indicated at 41. In order to accommodate this extra length of the step nozzle, the first section of residual heat removal conduit 21 may or may not be shortened, depending on conduit routing of the remainder of the residual heat removal system.

What is claimed is:

1. A pressurized water nuclear reactor system comprising:
   a reactor pressure vessel;
   at least one steam generator;
   a hot leg conduit having a diameter $D_1$, for charging a hot fluid from the reactor pressure vessel to said steam generator; at least one cold leg conduit for return of cool fluid from the steam generator back to said reactor pressure vessel;
   a first section of residual heat removal conduit having a diameter $D_2$, smaller than the diameter $D_1$ of said hot leg conduit, a first end for receipt of fluid from said hot leg, and a second end;
   a second section of residual heat removal conduit connected to said reactor pressure vessel;
   a pump interconnecting the second end of said first section of residual heat removal conduit with said second section of residual heat removal conduit; and
   a cylindrical conduit having a diameter $D_3$, which diameter $D_3$, is smaller than the diameter $D_1$ of said hot leg conduit and larger than the diameter $D_2$ of said first section of residual heat removal conduit, interconnecting said hot leg and said first section of residual heat removal conduit, said cylindrical conduit having a length L, that is greater than the diameter $D_3$, so as to reduce the momentum of a vortex formed in the fluid in the hot leg, passing to the first section of residual heat removal conduit, and break up said vortex to prevent air flow into and cavitation of said pump.

2. A pressurized water nuclear reactor system as defined in claim 1 wherein said cylindrical conduit comprises a step nozzle integrally formed with said hot leg conduit.

3. A pressurized water nuclear reactor system as defined in claim 1 wherein $D_3/D_1$ is at least a value of 0.55, $D_3/D_2$ is at least a value of 1.9, and $L/D_3$ is at least a value of 1.44.

4. A pressurized water nuclear reactor system comprising:
   a reactor pressure vessel;
   at least one steam generator;
   a hot leg conduit having a diameter $D_1$ for charging a hot fluid from the reactor pressure vessel to said steam generator; at least one cold leg conduit for return of cool fluid from the steam generator back to said reactor pressure vessel;
   a first residual heat removal conduit of a diameter $D_2$ having a first end for receipt of fluid from said hot leg, and a second end;
   a second residual heat removal conduit connected to said reactor pressure vessel;
   a pump interconnecting the second end of said first residual heat removal conduit with said second residual heat removal conduit; and
   a step nozzle of a diameter $D_3$ and a length L interconnecting said hot leg to the first end of said first residual heat removal conduit wherein $D_3/D_1 \geq 0.55$, wherein $D_3/D_2 \geq 1.9$, and wherein $L/D_3 \geq 1.44$.

5. In a pressurized water nuclear reactor system having a reactor pressure vessel, at least one steam generator, a hot leg conduit, having a diameter $D_1$, for charging of hot fluid from the reactor pressure vessel to said steam generator, and at least one cold leg conduit for return of cool fluid from the steam generator back to said reactor pressure vessel, the improvement comprising a residual heat removal device wherein:
   a first section of residual heat removal conduit is provided, having a diameter $D_2$ smaller than the diameter $D_1$ of said hot leg conduit, a first end for receipt of fluid from said hot leg and a second end;
   a second section of residual heat removal conduit is provided connected to said reactor pressure vessel;
   a pumps interconnects the second end of said first section of residual heat removal conduit with said second section of residual heat removal conduit; and
   a step nozzle in the form of a cylindrical conduit having a diameter $D_3$, which diameter $D_3$ is smaller than the diameter $D_1$ of said hot leg conduit and larger than the diameter $D_2$ of said first section of residual heat removal conduit, interconnects said hot leg and said first section of residual heat removal conduit, said step nozzle being of a length L, that is greater than the diameter $D_3$, so as to reduce the momentum of a vortex formed in the fluid in the hot leg, passing to the first section of residual heat removal conduit, and break up said vortex to prevent air flow into and cavitation of said pump.

6. In a pressurized water nuclear reactor system as defined in claim 5, the improvement wherein $D_3/D_1$ is at least a value of 0.55, $D_3/D_2$ is at least, a value of 1.9, and $L/D_3$ is at least a value of 1.44.

7. In a pressurized water nuclear reactor system having a reactor pressure vessel, at least one steam generator, a hot leg conduit for charging of hot fluid from the reactor pressure vessel to said steam generator, and at least one cold leg conduit for return of cool fluid from the steam generator back to said reactor pressure vessel, the improvement comprising a residual heat removal device wherein:
   said hot leg has an inside diameter $D_1$;
   a first section of residual heat removal conduit is provided, having an inside diameter $D_2$, a first end for receipt of fluid from said hot leg, and a second end;
   a second section of residual heat removal conduit is provided connected to said reactor pressure vessel;
   a pump interconnects the second end of said first section of residual heat removal conduit with said second section of residual heat removal conduit; and
   a step nozzle of an inside diameter $D_3$ and a length L interconnects said hot leg to the first end of said first section of residual heat removal conduit, with $D_3/D_1 \geq 0.55$, with $D_3/D_2 1.9$ and $L/D_3 \geq 1.44$.

* * * * *